(12) United States Patent
Branchereau et al.

(10) Patent No.: US 7,646,314 B2
(45) Date of Patent: Jan. 12, 2010

(54) ENCODER FOR SHAFT DEVICE COMPRISING ONE SUCH ENCODER AND PRODUCTION METHOD THEREOF

(75) Inventors: Bernard Branchereau, Segre (FR); Patrick Fayaud, Angers (FR)

(73) Assignee: Hutchinson Worldwide, Paris (FR)

( * ) Notice: Subject to any disclaimer, the term of this patent is extended or adjusted under 35 U.S.C. 154(b) by 352 days.

(21) Appl. No.: 11/547,303

(22) PCT Filed: Apr. 1, 2005

(86) PCT No.: PCT/FR2005/000801

§ 371 (c)(1),
(2), (4) Date: Apr. 23, 2007

(87) PCT Pub. No.: WO2005/100923

PCT Pub. Date: Oct. 27, 2005

(65) Prior Publication Data

US 2007/0290123 A1    Dec. 20, 2007

(30) Foreign Application Priority Data

Apr. 5, 2004 (FR) .................................. 04 03557

(51) Int. Cl.
*H03M 1/22* (2006.01)
(52) U.S. Cl. .......................................... 341/13; 341/11
(58) Field of Classification Search ............... 341/13, 341/11; 277/551, 572; 324/174; 384/448
See application file for complete search history.

(56) References Cited

U.S. PATENT DOCUMENTS

| | | | |
|---|---|---|---|
| 3,848,878 A | 11/1974 | Mayer | |
| 5,713,577 A | 2/1998 | Lannert et al. | |
| 5,850,277 A * | 12/1998 | Dang et al. | 352/214 |
| 6,595,693 B1 | 7/2003 | Message et al. | |
| 6,682,221 B2 | 1/2004 | Rutter et al. | |
| 7,341,257 B2 * | 3/2008 | Toth et al. | 277/551 |
| 2002/0140418 A1 | 3/2002 | Ichiman | |
| 2007/0041673 A1 * | 2/2007 | Maeda | 384/448 |

FOREIGN PATENT DOCUMENTS

| | | |
|---|---|---|
| EP | 0 949 510 | 2/1999 |
| EP | 0949510 | 10/1999 |

OTHER PUBLICATIONS

French preliminary search report of FR 04 03557 dated Sep. 21, 2004.
The International search report of PCT/FR2005/000801 dated Sep. 1, 2005.
International Search Report, PCT/FR2005/000801, mailed 12/98/2005.

* cited by examiner

*Primary Examiner*—Rexford N Barnie
*Assistant Examiner*—Joseph Lauture
(74) *Attorney, Agent, or Firm*—Frost Brown Todd LLC

(57) ABSTRACT

The invention relates to displacement encoder for a movable shaft, comprising a sleeve (2) which is intended to be fixed in rotation to the shaft (3) and an encoding element (4) which is made from magnetizable polymer and which is solidly connected to the sleeve, said encoding element being equipped with an encoding zone (6) having at least one polarized mark. The aforementioned encoding zone of the encoding element is covered with a protective layer (10) which is made from a polymer having a surface abrasion resistance greater than that of the magnetizable polymer. The invention also relates to a device comprising one such encoder and to a production method thereof.

11 Claims, 4 Drawing Sheets

ENCODER FOR SHAFT DEVICE COMPRISING ONE SUCH ENCODER AND PRODUCTION METHOD THEREOF

The present invention pertains to a displacement encoder for movable shaft, and more particularly, to an encoder comprising a sleeve intended to be fastened onto the shaft, and an encoder element made of magnetizable polymer which is attached to the sleeve, the encoder element exhibiting an encoding zone furnished with at least one polarized mark.

In numerous applications, and especially for wheel shafts, output shafts of gearboxes or crank shafts of internal combustion engines, the rotary shafts are equipped with an angular displacement encoding device for ascertaining their instantaneous speed of rotation and/or their angular position and/or their direction of rotation.

The encoding function may be carried out by one or more polarized magnetic marks. In this case, it is advantageous to effect the magnetic marks with the aid of a magnetizable polymer, that is to say a polymer of elastomer type, or any other substance that can afford a binding function, and containing a high proportion of magnetic particles such as for example ferrite powder. Specifically, such magnetizable polymers may be configured into various shapes by molding and their fixing to a support may be effected by direct sticking.

However, this type of encoder may turn out to be defective in certain types of harsh applications, the lifetime of the encoder then being reduced.

The inventors have determined that this drawback was related to the brittleness of the magnetizable polymer. Specifically, on account of the high proportion of magnetic particles, these polymers are relatively friable. Consequently, in certain applications where the angular encoder is particularly exposed to abrasive particles, such as for example dust or sand, a crumbling of the magnetizable polymer occurs. This may cause a reduction in the magnetic signal down to such a low value that it can no longer be detected by the magnetic sensor disposed opposite the angular encoder.

It is also possible in certain applications where the shaft performs a linear motion, for example a back and forth motion, to have an abrasion of a linear displacement encoder made of a magnetizable polymer which makes it possible to determine the position or the speed of linear displacement of the shaft.

The aim of the present invention is to alleviate these drawbacks by proposing a displacement encoder comprising an encoder element made of magnetizable polymer, which can be used in an aggressive environment without appreciable loss of the magnetic signal over time.

Accordingly, the subject of the present invention is an angular or linear displacement encoder of the aforesaid type characterized in that at least the encoding zone of the encoding element is covered with a protective layer made from a polymer which exhibits a greater surface abrasion resistance than the magnetizable polymer.

By virtue of the resistance of this protective layer, the magnetizable polymer is no longer attacked by the abrasive particles which may be present in the environment of the encoder element. The latter therefore lends itself particularly well to the encoding of the angular position of a wheel shaft so as to effect a vehicle antilock brake system function (ABS), or any other application in which the encoder is exposed to a mechanically aggressive environment.

In preferred embodiments of the invention, recourse is had, moreover, to one or other of the following provisions:

- the protective layer is made of PTFE, which, in addition to a sufficient surface abrasion resistance, exhibits the advantage of being non-stick so that the accumulation of dust on the encoder element is avoided;
- the encoder element is made of elastoferrite, which has the advantage of being able to stick directly both to metal and to PTFE;
- the protective layer sticks directly to the encoder element, thereby simplifying its manufacture;
- an annular lip made in one piece with the protective layer is intended to come into contact with a fixed casing surrounding the shaft, in such a way that the encoder also affords a dynamic leaktight sealing function;
- the encoder element exhibits at least one annular surface extending radially with respect to the shaft, and on which is formed the encoding zone, the protective layer covering said annular surface of the encoder element;
- the protective layer and the annular lip are formed by a substantially flat annulus; or else
- the protective layer (10) is overmolded over the encoder element.

The invention pertains also to a device comprising a rotary shaft and a displacement encoder which comprises a sleeve fastened in rotation to the shaft and an encoder element made of magnetizable polymer attached to said sleeve, the encoder element exhibiting an encoding zone furnished with at least one polarized mark and adapted so as to encode an angular displacement, characterized in that at least the encoding zone of the encoder element is covered with a protective layer made from a polymer which exhibits a greater surface abrasion resistance than the magnetizable polymer.

This device may furthermore comprise a casing filled with liquid in which the rotary shaft penetrates, and in which an annular lip, made in one piece with the protective layer, is in sliding contact with the casing and ensures leaktightness between said shaft and said casing.

It may also involve a device comprising a shaft sliding in the longitudinal direction thereof, and a displacement encoder which comprises a sleeve fastened in translation to the shaft and an encoder element made of magnetizable polymer attached to said sleeve, the encoder element exhibiting an encoding zone furnished with at least one polarized mark and adapted so as to encode a linear displacement, characterized in that at least the encoding zone of the encoder element is covered with a protective layer made from a polymer which exhibits a greater surface abrasion resistance than the magnetizable polymer.

Additionally, the subject of the invention is a method of manufacturing an angular encoder as defined previously, which comprises a sleeve, an annular encoder element made of elastoferrite and a protective layer made of a polymer which exhibits a greater surface abrasion resistance than the elastoferrite, characterized:

- in that said sleeve, a blank of said encoder element and a preform of said protective layer are placed concentrically in a first half mold, said blank being at least partially in contact with said sleeve and said preform being at least partially in contact with said blank; and
- in that a hot pressing is performed with the aid of a second half mold so as to crosslink said blank of the encoder element.

Other characteristics and advantages of the invention will become apparent in the course of the description which follows, given by way of nonlimiting example, with reference to the appended drawings in which.

In the various figures, the same references are retained to designate identical or similar elements.

Figure 1:
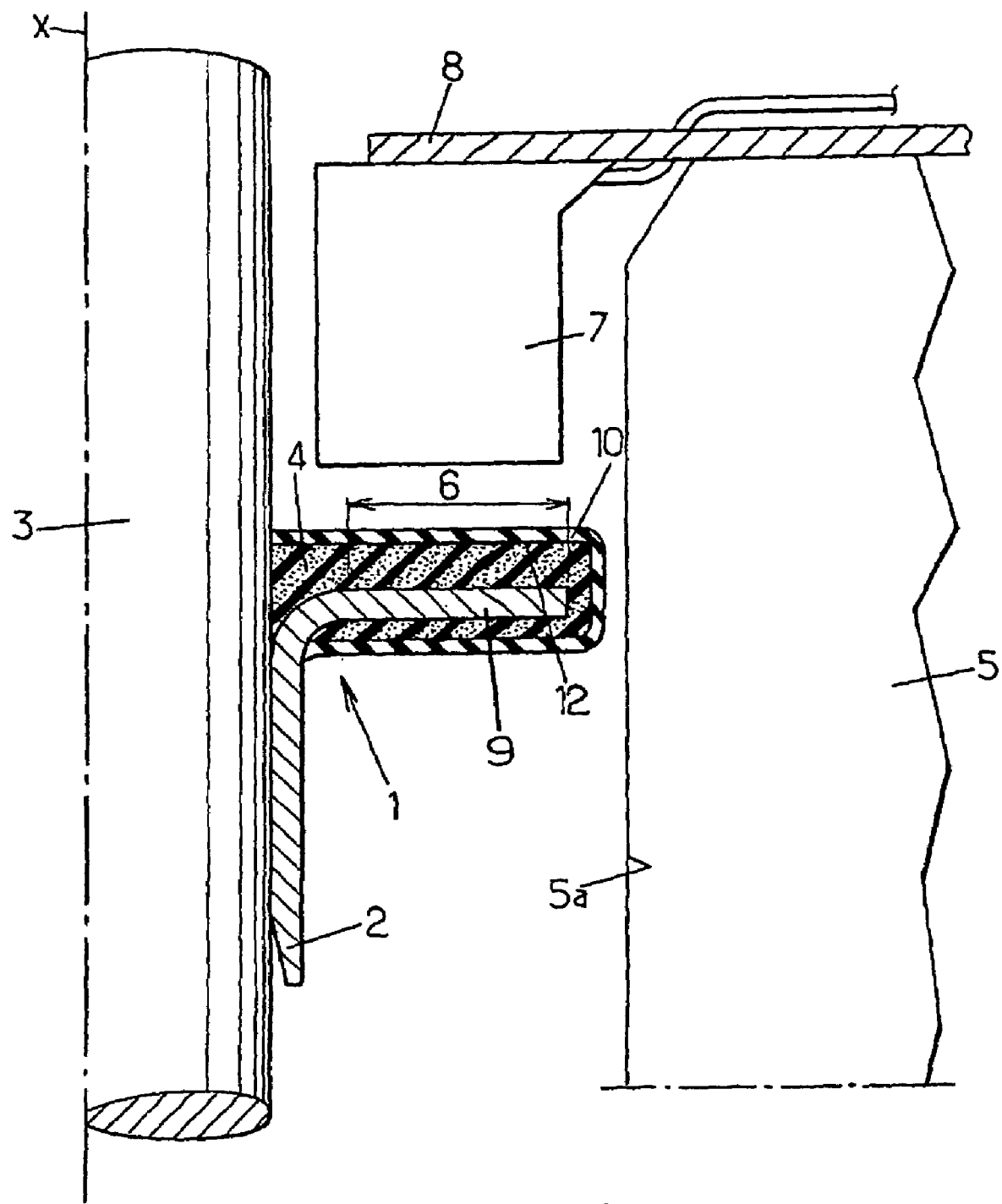
FIG. 1 is a simplified longitudinal sectional view through a shaft furnished with an angular encoder according to a first embodiment of the invention.

As may be seen in FIG. 1, the angular encoder 1 comprises a sleeve 2 fastened in rotation to a rotary shaft 3 and an encoder element made of magnetizable polymer 4. Polarized marks are provided in a zone 6, the so-called encoding zone of the encoder element.

A fixed casing 5 surrounding the angular encoder 1 serves as fixed base for a sensor 7 attached to the casing by way of a plate 8.

The rotary shaft 3 may consist of any revolving machine shaft, such as for example a transmission shaft or a wheel shaft. It will be noted that the angular encoder 1 is not necessarily placed on a portion of the shaft surrounded by a fixed casing, but may be placed some distance from any casing or bearing provided that a sensor can be kept in proximity to the encoding zone 6.

The sleeve 2 is metallic and is mounted on the rotary shaft 3 by force-fitting. This particularly simple mounting makes it possible to immobilize the sleeve 2 in rotation and in translation with respect to the shaft 3. However, any other mounting which ensures rotational immobilization of the sleeve with respect to the shaft may be used. It is also conceivable to use a sleeve made of plastic.

The encoder element 4 is made of elastoferrite, that is to say it comprises an elastomer-type polymer base which ensures the role of binder, and comprises a high proportion of ferrite particles whose magnetic orientation may be fixed during the vulcanization of the elastomer so as to create polarized marks. However, it is possible to use other types of magnetizable polymer.

In the embodiment represented, the encoder element 4 is overmolded over a radial flange 9 of the sleeve 2 and is attached to the latter by direct sticking. However, the encoder element may be fixed mechanically, or with the aid of an adhesive, to the sleeve. The encoder element 4 thus embodied exhibits an annular shape and extends globally in a radial direction with respect to the shaft 3.

The polarized marks of the encoding zone 6 are formed by a succession of angular sectors polarized alternately north-south, possibly with an unpolarized sector or a polarized zone which is more extensive or more restricted than the others, so as to determine an absolute angular position of the shaft. The encoding zone therefore forms a circular track in this embodiment. However, if the angular encoder is used only to detect a rotation or a direction of rotation of the shaft, the presence of polarized marks on the whole of the rim of the sleeve 2 is not necessary and in this case the encoder element 4 may take the form of one or two elements stuck to the sleeve.

The sensor 7 must be suitable for detecting a variation of the magnetic field and for this purpose it is possible to use in particular a Hall-effect sensor. The sensor 7 is positioned in a static manner opposite the circular encoding zone 6 formed by the polarized marks and at a distance close enough to detect the variations of the magnetic field.

The encoding zone 6 of the encoder element is covered with a protective layer 10 made of polymer. This polymer is chosen in such a way as to exhibit a greater surface resistance than that of the magnetizable polymer forming the encoding element 4. Thus, the abrasion which may be caused by the presence of particles or of grains of sand in the environment of the angular encoder is avoided and its lifetime is increased.

Various polymers may be employed to effect the protective layer and in particular thermoplastic polymers, which exhibit sufficient abrasion resistance, but also good transparency to magnetic fields and good properties of sticking to elastomer.

However, in the embodiment represented, the protective layer 10 is made of PTFE, also designated by the trade mark TEFLON®. This type of polymer exhibits a much greater surface resistance than elastoferrite and than most magnetizable polymers which are relatively friable on account of the significant proportion of magnetic particles that they contain. Moreover, PTFE has non-stick properties, thereby avoiding the accumulation of dust or of viscous liquid on the outside face of the protective layer.

Additionally, PTFE is not attacked by most chemical products, so that the layer 10 also forms a protection against solvents, fuels and other aggressive products that may be encountered in the environment of the encoder.

The protective layer 10 may be kept facing the encoding zone 6 by direct sticking to the magnetizable polymer, thereby simplifying manufacture and offering good mechanical strength. However, it is also conceivable to keep the protective layer 10 in place by adhesive bonding and possibly with mechanical fixing reinforcements.

The protective layer 10 must essentially cover the encoding zone 6 so as to avoid a loss of substances of the encoder element 4 at this level, which would cause a reduction in the magnetic signal. However, as may be seen in FIG. 1, the protective layer extends over the whole of the exterior surface of the encoder element 4 so as to avoid any abrasion of the latter which might cause detachment from the sleeve 2 or a loss of the shield role that the angular encoder may have between the shaft 3 and the fixed casing 5.

The coverage of the major part of the encoder element 4 is effected by overmolding in the embodiment represented in FIG. 1. The overmolded protective layer 10 exhibits a sufficiently slender thickness as not to increase the thickness of the gap separating the sensor 7 from the encoding zone 6. It will be noted that the protective layer 10 made of polymer, and in particular of PTFE, has no appreciable influence on the propagation of the magnetic field created by the polarized marks.

Figure 2:
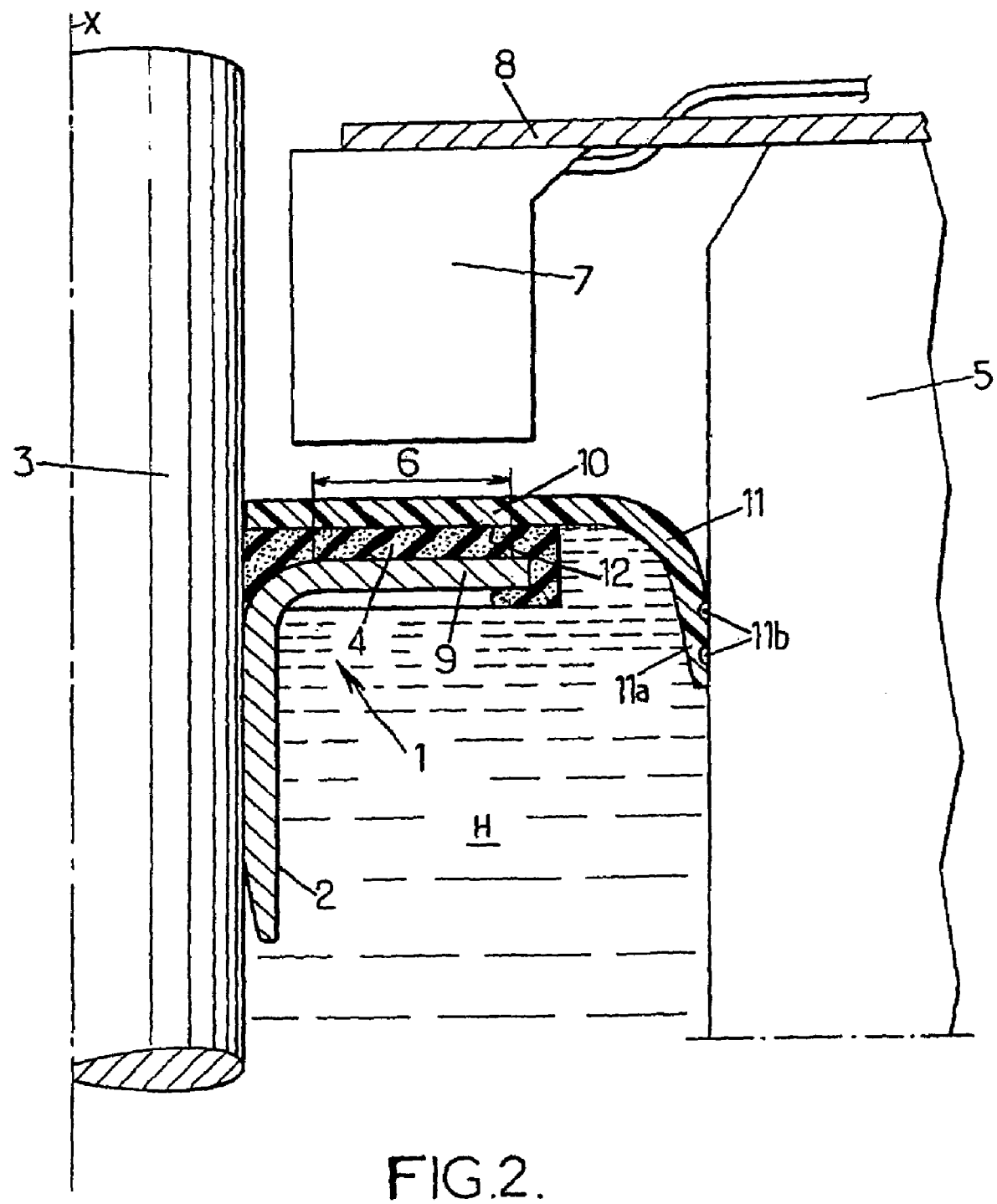
FIG. 2 is a sectional view similar to FIG. 1 of a second embodiment.

Represented in FIG. 2 is a second embodiment of the angular encoder 1 in which the protective layer 10 extends radially with respect to the shaft 3 beyond the encoder element 4 so as to come into contact with the fixed casing 5. Thus, the protective layer forms a leaktight lip 11 in sliding rotary contact with the casing 5. It will be noted that the fact that the protective layer 10 and the lip 11 made in one piece with the latter, are made of PTFE, is particularly beneficial on account of the low coefficient of friction of PTFE.

The angular encoder 1 thus embodied fulfils a dynamic leaktight sealing function in addition to its encoding function. This second embodiment of the angular encoder is therefore most particularly intended for a device such as an engine or a gearbox, in which the casing 5 filled with a liquid H, possibly under pressure, is traversed by a shaft 3, so as to ensure leaktightness between the shaft and the casing.

In the embodiment represented in FIG. 2, the base of the lip 11 extends substantially in a direct line with the protective layer 10 and is curved around in the configuration represented when the angular encoder is put in place on the shaft 3. On its surface in contact with the fixed casing 5, the end 11a of the lip may comprise grooves 11b which improve the dynamic sealing between the lip and the radial surface 5a of the casing opposite the shaft 3.

It is of course possible for the lip 11 to exhibit a more complex geometrical configuration so as to match the configuration of the surface with which it has to come into contact or to enhance its sealing properties.

The encoder element 4 exhibits an annular surface 12 extending radially and oriented along the longitudinal axis X of the shaft outwards from the casing 5. The annular surface 12 is entirely covered by the protective layer 10, thereby offering protection of the whole of the encoder element on account of the presence of the lip 11 which prevents the entry of abrasive particles into the inside of the casing 5. However, the annular surface could be partially covered, in particular if the encoding zone were not to extend over the whole of the latter.

It will be noted that this configuration of the encoder element 4 and of the sealing lip 11 makes it possible to embody the protective layer 10 on the basis of a substantially flat annulus, or ring, which has the advantage of being a component of simple geometry and consequently inexpensive. However, in the case where the encoder element 4 is formed by one or more elements fixed on the sleeve 2, it is possible to embody the lip 11 on the basis of a flat annulus and the protective layer(s) 10 by shapes extending radially inwards from the flat annulus forming the lip 11.

In the case where the encoder element 4 represented in FIG. 2 is made of elastoferrite, the angular encoder 1 can be manufactured according to the following method:

the sleeve 2, at least one blank of the encoder element 4 and a preform of the protective layer 10 are placed concentrically in a first half-mold in such a way that the blank of the encoder element 4 is at least partially in contact with the sleeve 2 and in such a way that the preform of the protective layer covers at least the encoding zones 6 of the encoder element 4; and a hot pressing is performed with the aid of a second half mold so as to crosslink the blank of the encoder element 4 and possibly to shape the protective layer 10 according to a particular configuration. This method makes it possible to assemble the various elements of the angular encoder, namely the sleeve 2, the encoder element 4 and the protective layer 10 in a single operation. In the case where the protective layer 10 extends to form a sealing lip 11, it is also possible to give the part of the preform forming the lip 11 a particular geometrical configuration. This makes it possible to embody an encoder element exhibiting a dynamic sealing lip in a single hot-pressing operation.

Figure 3:
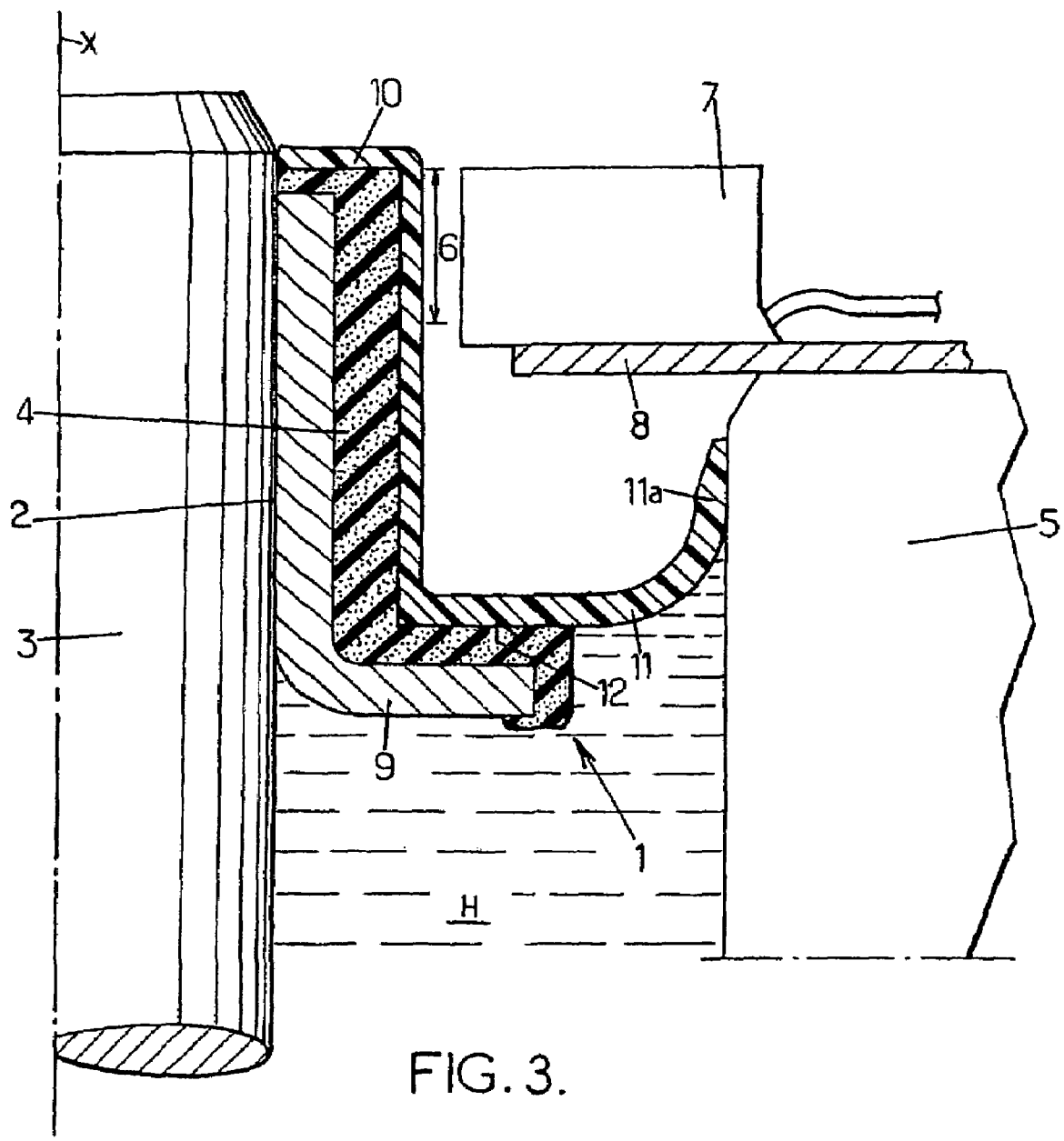
FIG. 3 is a sectional view similar to FIG. 1 of a third embodiment.
Figure 4:
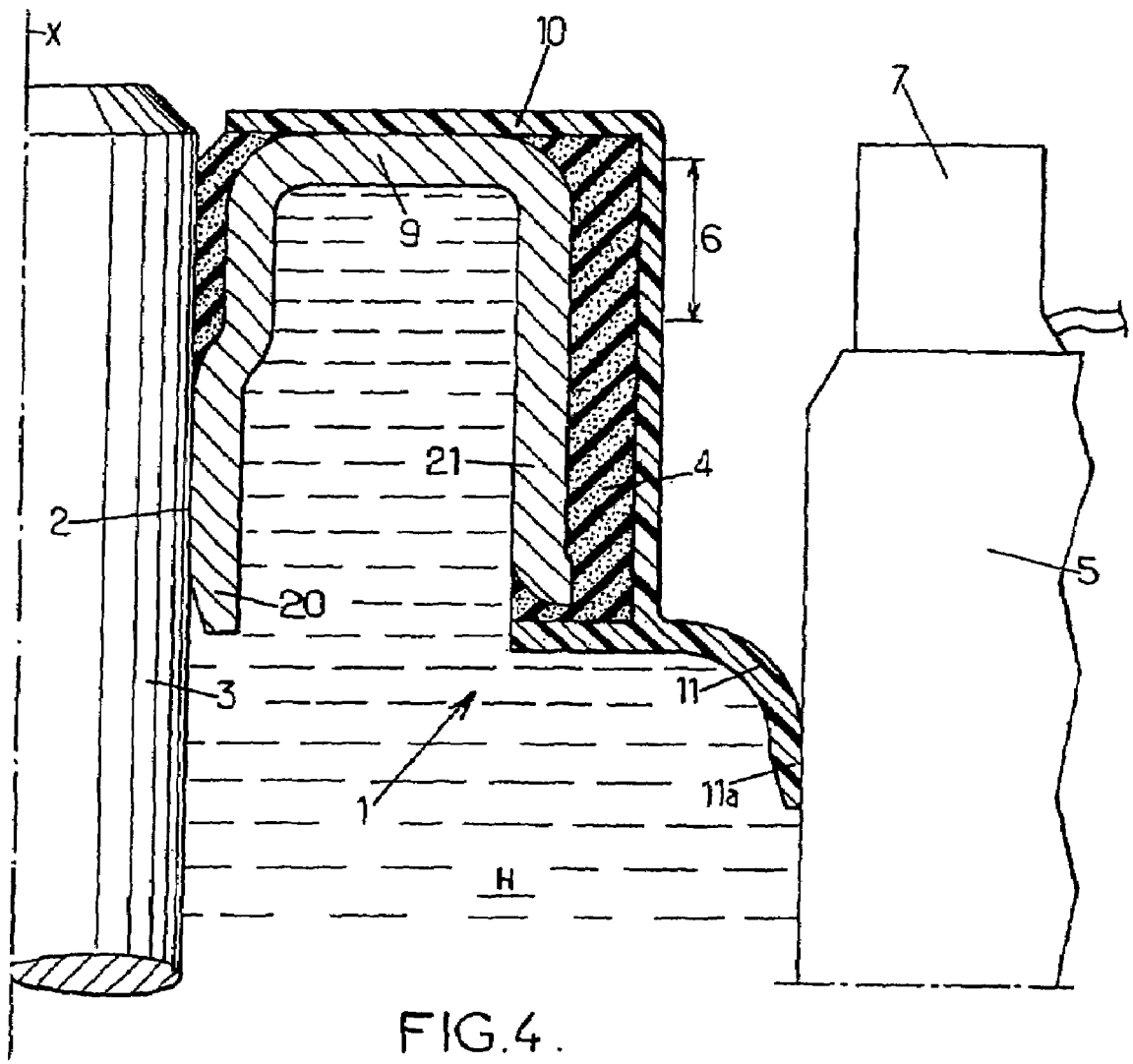
FIG. 4 is a sectional view similar to FIG. 1 of a fourth embodiment.

Represented in FIGS. 3 and 4 are two further embodiments which are similar to the second, that is to say comprising a lip 11 formed integrally with the protective layer 10.

In the third embodiment represented in FIG. 3, the encoding zone 6 extends longitudinally and is oriented radially towards the sensor 4 disposed opposite.

The protective layer 10 does of course cover the encoding zone 6, but also the entire outside surface of the encoder element and thus protects the whole of the latter against mechanical or chemical attack arising from outside the casing.

The lip 11 is stuck to the annular surface 12, just as in the second embodiment, but its thickness is greater than that of the part of the layer 10 covering the encoding zone 6.

In the fourth embodiment, the sleeve 2 exhibits a U cross section, a first branch 20 of the U gripping the shaft 3, a second branch 21 supporting the elastoferrite 4 and the base 9 of the U making it possible to offset part of the play between the shaft 3 and the casing 5.

Of course, the embodiments described above are wholly nonlimiting. It is in particular possible to embody an angular encoder whose encoder element does not extend in a radial or longitudinal direction, but in a direction inclined with respect to the shaft.

Additionally, it will be apparent to the person skilled in the art that the invention may be applied to a linear encoder, attached to a sliding shaft, whose encoder element made of magnetizable polymer exhibits at least one encoding zone. In this type of application, the encoding zone comprises a polarized mark, or several polarized marks distributed in the direction of sliding of the shaft, so as to be suitable for encoding a linear displacement. According to the invention, this zone encoding a linear displacement is covered by a layer of polymer exhibiting a greater abrasion resistance than the magnetizable polymer.

The invention claimed is:

1. A displacement encoder for movable shaft comprising a sleeve (2) intended to be fastened onto the shaft (3), and an encoder element (4) made of magnetizable polymer attached to said sleeve, the encoder element exhibiting an encoding zone (6) furnished with at least one polarized mark, characterized in that at least the encoding zone of the encoding element is covered with a protective layer (10) made from PTFE, which polymer exhibits a greater surface abrasion resistance than the magnetizable polymer.

2. The encoder as claimed in claim 1, in which the encoder element (4) is made of elastoferrite.

3. The encoder as claimed in claim 1, in which the protective layer (10) sticks directly to the encoder element (4).

4. The encoder as claimed in claim 1, in which an annular lip (11) made in one piece with the protective layer (10) is intended to come into contact with a fixed casing (5) surrounding the shaft (3).

5. The encoder as claimed in claim 1, in which the encoder element (4) exhibits at least one annular surface (12) extending radially with respect to the shaft, and on which is formed the encoding zone (6), the protective layer (10) covering said annular surface of the encoder element.

6. The encoder as claimed in claim 5, in which the protective layer (10) and the annular lip (11) are formed by a substantially flat annulus.

7. The encoder as claimed in claim 1, in which the protective layer (10) is overmolded over the encoder element (6).

8. A method of manufacturing an encoder as claimed in claim 1, comprising a sleeve (2), an encoder element (4) made of elastoferrite and a protective layer (10) made of a polymer which exhibits a surface abrasion resistance to the elastoferrite, characterized:

in that said sleeve (2), a blank of said encoder element (4) and a preform of said protective layer (10) are placed concentrically in a first half mold, said blank being at least partially in contact with said sleeve and said preform covering at least partially the encoding zone (6) of the blank of the encoder element; and in that a hot pressing is performed with the aid of a second half mold so as to crosslink said blank of the encoder element.

9. A device comprising a rotary shaft (3) and a displacement encoder which comprises a sleeve (2) fastened in rotation to the shaft (3) and an encoder element (4) made of magnetizable polymer attached to said sleeve, the encoder element exhibiting an encoding zone (6) furnished with at least one polarized mark and adapted so as to encode an angular displacement, characterized in that at least the encoding zone of the encoder element is covered with a protective layer (10) made from PTFE, which polymer exhibits a greater surface abrasion resistance than the magnetizable polymer.

10. The device as claimed in claim 9 furthermore comprising a casing (5) filled with liquid (H) in which the rotary shaft (3) penetrates, and in which an annular lip (11), made in one piece with the protective layer (10), is in sliding contact with the casing and ensures leak tightness between said shaft and said casing.

11. A device comprising a shaft sliding in the longitudinal direction thereof, and a displacement encoder which comprises a sleeve fastened in translation to the shaft and an encoder element made of magnetizable polymer attached to said sleeve, the encoder element exhibiting an encoding zone furnished with at least one polarized mark and adapted so as to encode a linear displacement, characterized in that at least the encoding zone of the encoder element is covered with a protective layer made from PTFE, a polymer which exhibits a greater surface abrasion resistance than the magnetizable polymer.

* * * * *